United States Patent [19]

Evers

[11] 4,053,498

[45] Oct. 11, 1977

[54] PERFLUOROALKYLENE ETHER-IMIDATE AND -THIOIMIDATE ESTERS

[75] Inventor: Robert C. Evers, Dayton, Ohio

[73] Assignee: The United States of America as represented by the Secretary of the Air Force, Washington, D.C.

[21] Appl. No.: 710,089

[22] Filed: July 30, 1976

[51] Int. Cl.$^2$ .............................................. C07C 83/10
[52] U.S. Cl. ........................... 260/453 RW; 260/47 R
[58] Field of Search .................... 260/453 R, 453 RW

[56] References Cited

U.S. PATENT DOCUMENTS 3,112,334   11/1963   Behun .......................... 260/453 RW

FOREIGN PATENT DOCUMENTS 2,426,913   4/1974   Germany ......................... 260/453 R Primary Examiner—Delbert R. Phillips
Attorney, Agent, or Firm—Joseph E. Rusz; Cedric H. Kuhn

[57] ABSTRACT

Hexafluoropropylene oxide-terminated perfluoroalkylene ether-imidate and -thioimidate esters are prepared by the reaction of certain perfluoroalkylene ether dinitriles with trifluoroethanol or ethanethiol. The compounds are useful as monomers in synthesizing thermooxidatively stable, low glass transition temperature perfluoroalkylene ether bibenzoxazole polymers with improved hydrolytic stability properties.

6 Claims, No Drawings

PERFLUOROALKYLENE ETHER-IMIDATE AND -THIOIMIDATE ESTERS

RIGHTS OF THE GOVERNMENT

The invention described herein may be manufactured and used by or for the Government of the United States for all governmental purposes without the payment of any royalty.

FIELD OF THE INVENTION

This invention relates to hexafluoropropylene oxide-terminated perfluoroalkylene ether-imidate and -thioimidate esters. In one aspect it relates to a process for preparing the esters.

BACKGROUND OF THE INVENTION

A great deal of research work has been conducted with the object of providing thermally stable, elastomeric polymers for various aerospace seal and sealant applications. To meet the rigid requirements for such applications, a polymer must also retain its elastomeric properties at sub-zero temperatures. Polymers that advance the art in meeting the requirements are disclosed by me in U.S. Pat. No. 3,846,376. Furthermore, in my copending U.S. application Ser. No. 610,474, filed on Sept. 4, 1975, and now issued as U.S. Pat. No. 3,994,861, thermally stable polymers are disclosed that retain their viscoelastic properties at temperatures even lower than do the polymers described in the aforementioned patent. While the polymers disclosed in the cited patent and patent application possess a broad use temperature range, they are often hydrolytically unstable upon exposure to humid conditions at elevated temperatures for extended periods of time. It would be very desirable to provide monomers that could be used to prepare polymers having a broad use temperature range that are also hydrolytically stable under severe conditions.

It is an object of this invention, therefore, to provide compounds that can be used as monomers in the synthesis of hydrolytically stable polymers having a broad use temperature range.

Another object of the invention is to provide a process for preparing perfluoroalkylene ether-imidate and -thioimidate ester monomers.

Other objects and advantages of the invention will become apparent to those skilled in the art upon consideration of the accompanying disclosure.

SUMMARY OF THE INVENTION

The present invention resides in perfluoroalkylene ether-imidate and -thioimidate esters having the following structural formulas:

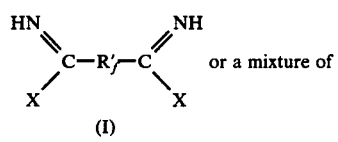

or a mixture of

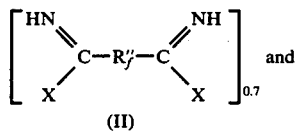

and

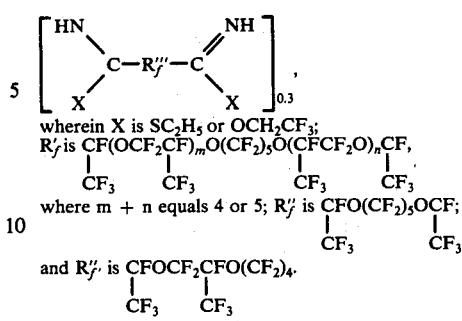

wherein X is $SC_2H_5$ or $OCH_2CF_3$;
$R'_f$ is $CF(OCF_2CF)_mO(CF_2)_5O(CFCF_2O)_nCF$,
with $CF_3$ groups on the indicated carbons;
where $m + n$ equals 4 or 5; $R''_f$ is $CFO(CF_2)_5OCF$ with $CF_3$ groups;
and $R'''_f$ is $CFOCF_2CFO(CF_2)_4$ with $CF_3$ groups.

In one embodiment, the present invention lies in a process for synthesizing the above-described compounds. The reaction involved in preparing compounds corresponding to formula (I) can be represented by the following equation:

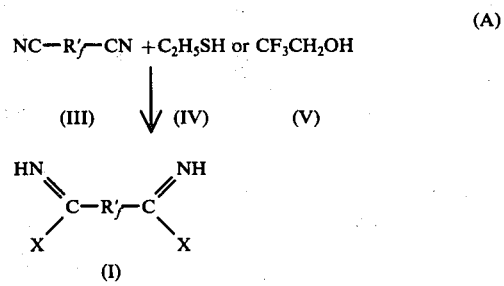

(A)

In the foregoing equation (A), $R'_f$ and X are as indicated hereinabove. When the dinitrile (III) is reacted with ethanethiol (IV) the product (I) is a thioimidate ester. Reaction of the dinitrile (III) with trifluoroethanol (V) provides a product (I) which is an imidate ester.

The reaction involved in preparing a mixture of compounds corresponding to formula II can be represented by the following equation.

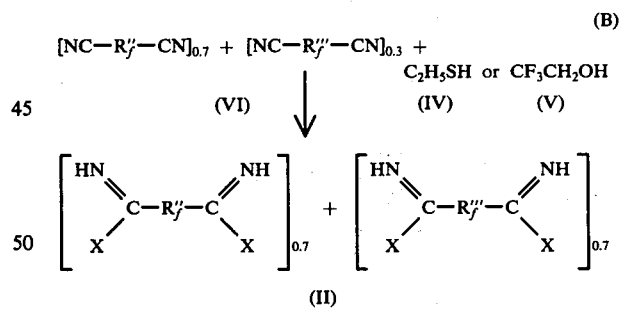

(B)

In the foregoing equation (B), $R''_f$, $R'''_f$ and X are as indicated herein-above. When the mixture of dinitriles (VI) is reacted with ethanethiol (IV), the product (II) is a mixture of thioimidate esters. Reaction of the mixture of dinitriles (VI) with trifluoroethanol (V) provides a product (II) which is a mixture of imidate esters.

In carrying out the reactions represented by equations (A) and (B), the perfluoroalkylene ether dinitrile or mixture of dinitriles is reacted in the presence of a catalytic amount of an alkali metal 2,2,2-trifluoroethoxide, an alkali metal thioethoxide, or triethylamine with an excess of ethanethiol or trifluoroethanol. Examples of alkali metal 2,2,2-trifluoroethoxides and thioethoxides that can be used include sodium and potassium 2,2,2-trifluoroethoxide and thioethoxides. In preparing imidate esters alkali metal 2,2,2-trifluoroethoxides are employed while in the preparation of the thioimidate esters alkali metal thioethoxides are used. However, it is usually preferred to utilize triethylamine as the catalyst, particularly because of its ease of removal from the reaction mixture. The amount of catalyst used can vary within rather broad limits, but it usually ranges from about 0.05 to 0.30 mole per mole of dinitrile. The mole ratio of the ethanethiol of trifluoroethanol to dinitrile is at least 2 to 1, e.g., 2 to 150:1. It is noted that the ethanethiol and trifluoroethanol in addition to being reactants function as reaction media.

The reaction is conducted at a temperature ranging from about 0° C to 100° C for a period of about 6 to 36 hours. At the end of the reaction period, when using triethylamine as the catalyst, the thioimidate or imidate ester product is recovered by distilling off triethylamine and any excess ethanethiol or trifluoroethanol. When employing an alkali metal 2,2,2-trifluoroethoxide or thioethoxide as the catalyst, the reaction mixture is washed several times with water. After each washing the settled water layer containing catalyst is separated and discarded. Any residual ethanethiol or trifluoroethanol is then distilled off, leaving the thioimidate or imidate ester product.

The perfluoroalkylene ether dinitriles employed in synthesizing the compounds of this invention can be prepared from poly(perfluoroether)diacid fluorides by amidation and dehydration with phosphorous pentoxide. The procedure for preparing the dinitriles is described in more detail in U.S. Pat. No. 3,317,484 while U.S. Pat. No. 3,250,807 discloses a process for preparing the diacid fluorides.

The compounds of this invention are useful as monomers in preparing thermally stable perfluoroalkylene ether bibenzoxazole polymers having excellent low temperature viscoelastic properties. Furthermore, the hydrolytic stability of the polymers is outstanding, greatly surpassing that of bibenzoxazole polymers of the prior art. The polymers are synthesized by the polycondensation of an imidate or thioimidate ester of this invention with a fluorocarbon ether bis(o-aminophenol) monomer. A more complete discussion of the synthesis of the polymers is contained in my copending application Ser. No. (710,088), filed on July 30, 1976, the disclosure of which is incorporated herein by reference. The unexpected improvement in the hydrolytic stability of the polymers is attributed to the structure of the imidate and thioimidate esters used as monomers. Thus, in the polycondensation reaction, the pendent $CF_3$ groups attached to the carbon atoms adjacent the terminal carbon atoms of the imidate and thioimidate esters become attached to the carbon atom at the 2-position of the benzoxazole ring. The presence of the $CF_3$ groups prevents water from attacking the benzoxazole rings, thereby enhancing the polymer's hydrolytic stability.

A more comprehensive understanding of the invention can be obtained by referring to the following illustrative examples which are not intended, however, to be unduly limitative of the invention. In Examples I and II, runs are described in which the dinitrile intermediates are prepared that are used in Examples III, IV and V.

EXAMPLE I

Preparation of:

(III)

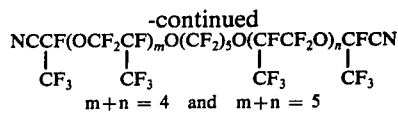

m+n = 4 and m+n = 5 a. Ether Diacid Fluorides

Hexafluoroglutaryl fluoride (288 g) was added to a slurry of cesium fluoride (10 g) in tetraglyme (200 ml). After the exothermic reaction subsided, the mixture was frozen at liquid oxygen temperature and the reaction flask was evacuated. The reaction mixture was allowed to warm to 0° C and hexafluoropropylene oxide was slowly added through a vacuum manifold at 600–700 psi while maintaining the reaction temperature at −5° C to 5° C. The reaction was monitored by frequent sampling and GLC analysis. The reaction was terminated when the major products were the following acid fluorides;

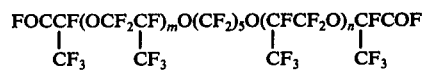

m + n = 4

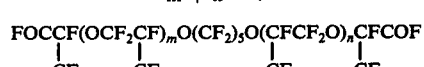

m + n = 5

The fluorocarbon layer was separated from the solvent layer. The mixture of acid fluoride oligomers was subjected to vacuum distillation and the lower molecular weight components were removed, leaving 720 grams of residue consisting of a mixture of acid fluorides having the foregoing formulas.

b. Perfluoroalkylene Ether Dinitriles

The acid fluorides prepared as described in (a) above were esterified with an excess of methanol. The esters were precipitated with water, separated, dissolved in Freon-113 fluorocarbon (1,1,2-trichlorotrifluoroethane) (1 liter) and dried over magnesium sulfate. Anhydrous ammonia was bubbled through the solution of esters. After removal of the solvent under vacuum, the amides so obtained were mixed with phosphorous pentoxide (460 g) and the mixture was heated for several hours at 220°–240° C. The dinitriles formed by dehydration of the amides were distilled off under vacuum. There was obtained 588 g of product consisting of 40.1 percent of dinitrile (III) ($m+n=4$) and 49.9 percent of dinitrile (III) ($m+n=5$). Fractionation of the mixture gave 189 g of dinitrile (III) ($m+n=4$), b.p. 108°–110° C/0.3 mm Hg, and 257 g of dinitrile (III) ($m+n=5$), b.p. 133°–135° C/0.6 mm Hg.

(VI)

Preparation of: 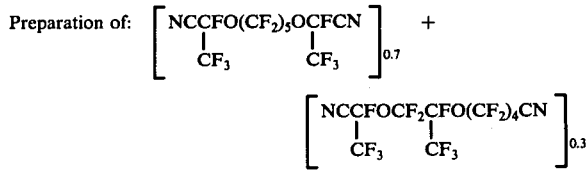

a. Ether Acid Fluoride Mixture

Hexafluoroglutaryl fluoride (564 g, 2.31 moles) was added dropwise to a stirred slurry of dry cesium fluoride (59.2 g, 0.40 mole) in 740 ml of freshly distilled diglyme. A slight exotherm was noted. The mixture was cooled in an ice water bath as hexafluoropropylene oxide (1173 g, 7.07 moles) was added through a manifold at a pressure of 1000 mm Hg over a 2-hour period. The product mixture was distilled through a 900 cm, glass-packed column to give 662 g (49.3% yield) of the isomeric acid fluoride mixture (70% symmetrical; 30% unsymmetrical) b.p., 155°–158° C. The product was characterized by infrared and nuclear magnetic resonance spectroscopy.

b. Perfluoroalkylene Ether Dinitriles (VI)

A portion of the isomeric acid fluoride product (382 g, 0.663 mole), prepared as described in (a) above, was added dropwise to 200 g of stirred methanol at room temperature. After the addition was completed, the mixture was stirred for 16 hours at which time it was poured into an excess of water. The bottom layer was separated to give 344 g (87% yield) of the crude dimethyl ester.

The diester was dissolved in 500 ml of diethyl ether and the solution was cooled to 0° C. Anhydrous ammonia was added slowly to the cooled solution until the saturation point was reached. Removal of the diethyl ether gave the crystalline white diamide.

The diamide was mixed with a large excess of phosphorous pentoxide, and the solid mixture was then heated to 200° C under vacuum. The volatile product was collected as a white solid at −28° C. Distillation through an 18 inch column packed with 3/16 inch glass helices gave 178 g (0.354 mole) of the isomeric nitrile mixture (VI), b.p. 151° C. The amount represents an overall yield of 61 percent, based on the dimethyl ester.

EXAMPLE III

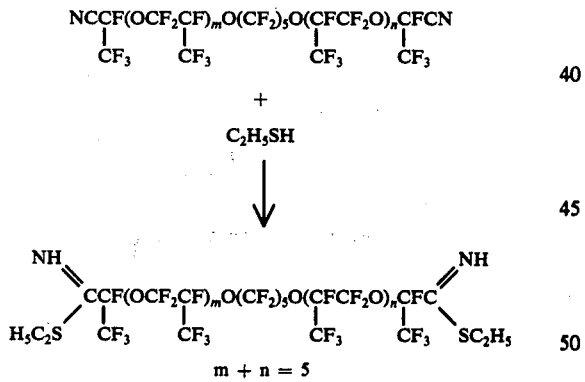

The perfluoroalkylene ether dinitrile (24.0 g, 0.018 mole), prepared as described in Example I, was added dropwise over the course of 1 hour to a vigorously stirred solution of 12 drops of dry triethylamine in 20 ml of ethanethiol. The temperature of the reaction mixture was maintained at approximately 0° C during the addition and was then allowed to reach room temperature. Stirring was continued for 18 hours at which time the excess ethanethiol and triethylamine were distilled over at atmospheric pressure. Distillation of the clear, pale yellow residue yielded 13.2 g (50% yield) of the thioimidate ester, b.p. 168°–72° C/0.03 mm Hg.

Analysis Calc's: C, 24.21; H, 0.81; N, 1.88; S, 4.31; Found: C, 24.38; H, 0.75; N, 1.76; S, 4.72.

Molecular weight (mass spectroscopy): Calc'd: 1488; Found: 1488.

EXAMPLE IV

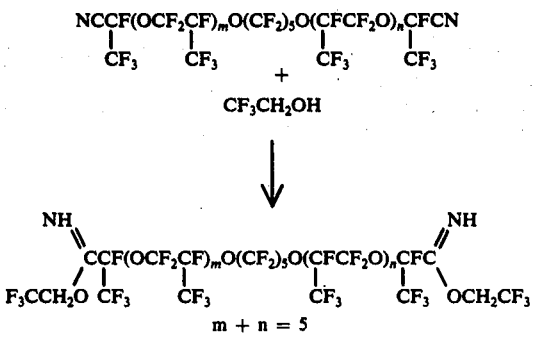

The perfluoroalkylene ether dinitrile (20.0 g, 0.015 mole), prepared as described in Example I, was added dropwise at room temperature to a vigorously stirred solution of 12 drops of dry triethylamine in 15 ml of redistilled trifluoroethanol. The reaction mixture was then stirred for 15 hours at 55° C and for 1 hour at 75° C at which time the excess trifluoroethanol and triethylamine were distilled off at aspirator pressure. Distillation of the clear, water-white residue yielded 18.4 g (79% yield) of the imidate ester, b.p. 137°–139° C/0.02 mm Hg.

Analysis Calc'd: C, 23.03; H, 0.38; N, 1.79; Found: C, 23.00; h, 0.56; N, 1.76.

Molecular weight (mass spectroscopy): Calc'd: 1564; Found: 1564.

EXAMPLE V

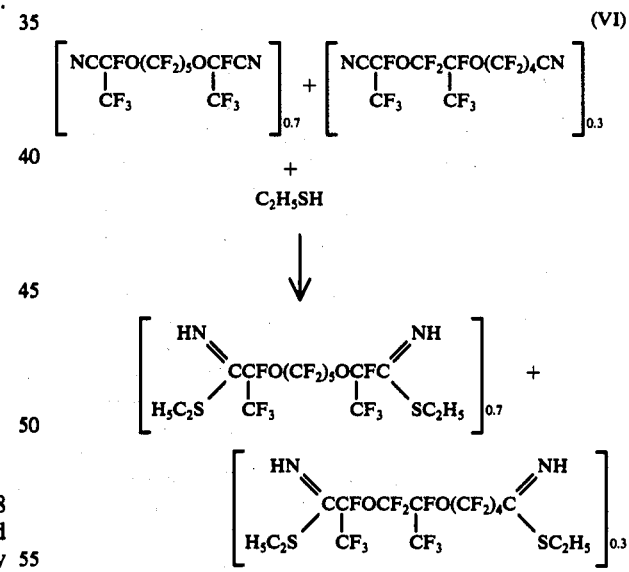

The isomeric nitrile mixture (VI) (30 g), prepared as described in Example II, was added dropwise at room temperature over a period of 30 minutes to a vigorously stirred solution of 1.0 ml of dry triethylamine in 40 ml of ethanethiol. Stirring was continued for 24 hours at which time the excess ethanethiol and triethylamine were distilled over at atmospheric pressure. Distillation of the clear, pale yellow residue yielded 20.2 g (54.6% yield) of the thioimidate ester, b.p. 105°–107° C/0.01 mm Hg.

Analysis Calc'd: C, 27.37; H, 1.84; N, 4.25; S, 9.74; Found: C, 27.35; H, 1.55; N, 4.31; S, 9.67.

Molecular weight (mass spectroscopy): Calc'd: 658; Found: 658.

EXAMPLE VI

A run was conducted in which a perfluoroalkylene ether bibenzoxazole polymer was synthesized by the polycondensation of the perfluoroalkylene ether thioimidate ester as prepared in Example III with a fluorocarbon ether bis(o-aminophenol). The reaction involved is shown by the following equation:

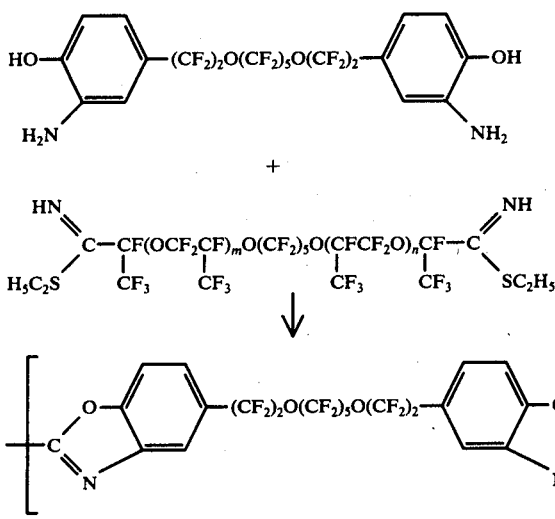

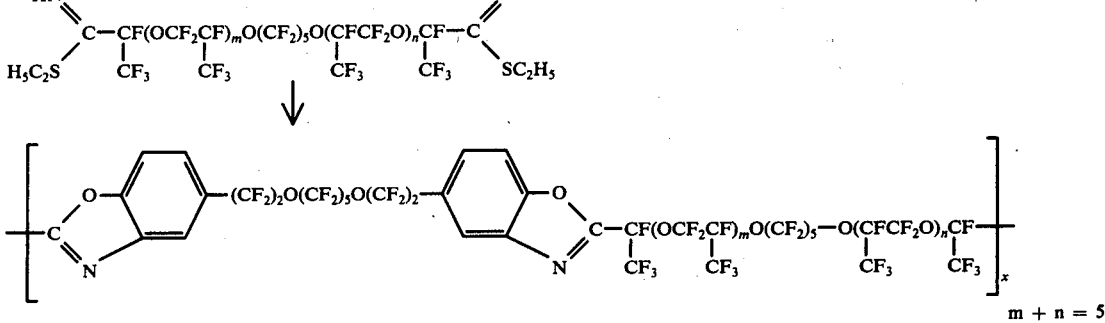

To a mixture of thioimidate ester (I) (0.350 g, 0.0005 mole) and aminophenol (VIII) (0.745, 0.0005 mole) there was added 3 ml of redistilled hexafluoroisopropanol. Glacial acetic acid (0.12 g, 0.002 mole) was added with stirring to the resultant amber solution. The polycondensation reaction was allowed to proceed with stirring under nitrogen at 55°-60° C for 264 hours at which time the viscous reaction mixture was poured into 100 ml of stirred methanol. The supernatant liquid was decanted and the tacky, swollen polymer was dissolved in 10 ml of Freon-113 fluorocarbon. The solution was filtered and added dropwise to 100 ml of stirred methanol. The precipitated polymer was washed several times by vigorous stirring with methanol. Drying for 1 hour at 100° C (0.05 mm Hg) and 2 hours at 188° C (0.05 mm Hg) yielded 0.63 g (62% yield) of rubbery polymer ($\eta$ inh = 0.25 dl/g in hexafluoroisopropanol at 25° C.).

Analysis Calc'd: C, 27.83; H, 0.30; N, 1.38; Found: C, 28.59; H, 0.25; N, 1.40.

Physical Properties

Thermogravimetric analysis indicated that onset of breakdown in air occurred at 400° C with a 25% weight loss at 500° C. Differential scanning calorimetry revealed a glass transition temperature of −19° C. No changes in the polymer's infrared spectrum and inherent viscosity were observed after exposure to a water vapor atmosphere at 100° C for 1 week.

From the foregoing, it is seen that the compounds of this invention can be employed in synthesizing elastomeric polymers that can be used over a broad temperature range. Of particular significance is the outstanding hydrolytic stability of the polymers. This combination of properties makes the polymers especially useful for various aerospace seal and sealant applications.

As will be evident to those skilled in the art, various modifications of the invention can be made in view of the foregoing disclosure without departing from the spirit and scope of the invention.

I claim:

1. A compound having the following formula:

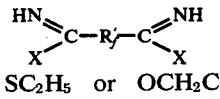

wherein X is $SC_2H_5$ or $OCH_2CF_3$; and $R_f'$ is $CF(OCF_2CF)_mO(CF_2)_5O)CFCF_2O)_nCF$ , where m+n
|          |          |          |          |
$CF_3$    $CF_3$    $CF_3$    $CF_3$ equals 4 or 5.

2. A mixture of compounds having the following formulas:

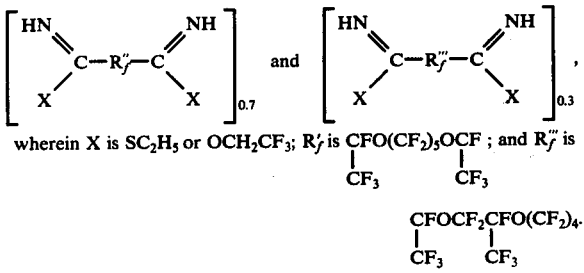

wherein X is $SC_2H_5$ or $OCH_2CF_3$; $R_f'$ is $CFO(CF_2)_5OCF$ ; and $R_f''$ is
                                                  |           |
                                                 $CF_3$      $CF_3$ $CFOCF_2CFO(CF_2)_4$.
|         |
$CF_3$   $CF_3$ 3. The compound according to claim 1 in which X is $SC_2H_5$ and $R_f'$ is $CF(OCF_2CF)_mO(CF_2)_5O(CFCF_2O)_nCF$ , where m + n equals 5.
         |          |                    |          |
        $CF_3$     $CF_3$               $CF_3$     $CF_3$ 4. The compound according to claim 1 in which X is $OCH_2CF_3$ and $R_f'$ is $CF(OCF_2CF)_mO(CF_2)_5O(CFCF_2O)_nCF$ , where m + n equals 5.
         |          |                    |          |
        $CF_3$     $CF_3$               $CF_3$     $CF_3$ 5. The mixture of compounds according to claim 1 in which X is $SC_2H_5$.

6. The mixture of compounds according to claim 1 in which X is $OCH_2CF_3$.

* * * * *

UNITED STATES PATENT AND TRADEMARK OFFICE
CERTIFICATE OF CORRECTION

PATENT NO. : 4,053,498
DATED : October 11, 1977
INVENTOR(S) : Robert C. Evers

It is certified that error appears in the above-identified patent and that said Letters Patent are hereby corrected as shown below:

Column 8, line 14, that portion of the $R_f'$ group reading "$)CFCF_2O)_n$"
$CF_3$ should read -- $(CFCF_2O)_n$ --, line 45, "$R_f'$" should read -- $R_f''$ --,
$CF_3$ and lines 65 and 67, for the claim reference numeral "1", each occurrence, should read -- 2 --.

Signed and Sealed this

Twenty-third Day of May 1978

[SEAL]

Attest:

RUTH C. MASON
Attesting Officer

LUTRELLE F. PARKER
Acting Commissioner of Patents and Trademarks